Patented Nov. 29, 1932

1,889,067

UNITED STATES PATENT OFFICE

HARRISON P. HOOD, OF CORNING, NEW YORK, ASSIGNOR TO CORNING GLASS WORKS, OF CORNING, NEW YORK, A CORPORATION OF NEW YORK

METHOD OF PRODUCING REVIVIFIED ULTRAVIOLET TRANSMITTING GLASSES

No Drawing.   Application filed October 15, 1927.   Serial No. 226,516.

This invention relates to the art of ultraviolet transmitting glasses, and more particularly to the restoration of ultraviolet transmission to glasses which have lost their transparency to beneficial ultraviolet radiation.

For many purposes, such as the treatment of rickets, it is highly desirable to subject the patient to ultraviolet radiation, but owing to the practical impossibility of remaining out of doors for sufficiently long periods of time, and the fact that the ultraviolet rays are absorbed in passing through ordinary window glass, many attempts have been made to produce glasses which will transmit a large percentage of the ultraviolet radiation reaching them.

It has been found, however, that glasses which originally allowed a large percentage of the beneficial rays to pass will gradually lose their power of transmission, upon continued exposure to ultraviolet radiation, until they become so largely absorptive of these rays that they become of little or no value for their intended purpose.

I have found that the ultraviolet transmitting properties of such glasses can be restored by heating them up to approximately their annealing temperature.

It is therefore an object of this invention is to produce revivified glasses, and to provide a method of restoring the property of ultraviolet transmission to glasses which once possessed this power and have subsequently lost it.

In my prior application, Ser. No. 62,468, filed Oct. 14, 1925, and in my copending application filed of even date herewith, I have disclosed a large series of ultraviolet transmitting glasses and a method of making same, which consists in decreasing the total iron and titanium contents as much as possible and then reducing any remaining iron to the ferrous condition. When I learned that ultraviolet transmitting glasses of widely varying types lost their transmitting power upon long continued exposure to ultraviolet radiation, I conceived the idea that this was due to an oxidation of the ferrous iron by the breaking up of some of the ferrous oxide into colloidal iron and oxygen, and that the latter combined with remaining molecules of ferrous oxide to form ferric oxide. This was thought to be a reversible reaction and was shifted into an unstable condition by means of ultraviolet radiation, thus causing something equivalent to a strained condition in the glass. It then occurred to me that if the glass was heated to a high enough temperature to allow a motion of the molecules, so that they could assume their natural equilibrium, the property of ultraviolet transmission would be restored.

To test my conception in a reasonable length of time, it was necessary to utilize some accelerated method of deteriorating the ultraviolet transmission characteristics of various glasses. Inasmuch as a quartz mercury arc is a prolific source of ultraviolet radiation, especially of the waves of shorter length than those occurring in sunlight, it was obvious that a short period of exposure to such a source of ultraviolet radiation would be equivalent to a very much longer exposure to sunlight. I therefore subjected a large range of glasses to the radiation of a quartz mercury arc for varying periods of time, such as 1, 2, 3, 4, 6, 8, 10, 18, 30, 45, 73, and 96 hours, and measured the transmission of the glasses thus exposed before and after exposure. I found that all of the commercial ultraviolet transmitting window glasses now available lost a large portion of their original ultraviolet transmitting characteristics, some of these glasses losing practically all of their ultraviolet transparency in the region between 290 and 310 millimicrons, which has been found to be especially beneficial for the treatment of rickets and certain other diseases. In some of the glasses tested, this loss of transmission was evident after one or two hours' exposure, and in others it was apparent only after ten hours' exposure. It was also found that for each glass there was a certain minimum transmission for a given wave length beyond which further exposure caused no further effect, but in all of the commercial glasses tested this minimum was too low for efficient use for the purpose intended.

It has been found in practice that glasses exposed to sunlight lost their ultraviolet transmission in a similar manner, althrough at a much slower rate.

Samples of the glasses which have been given this accelerated exposure to ultraviolet radiation were then heated to 550° C. for fifteen minutes and then allowed to cool to room temperature. They were then measured to determine their ultraviolet transmission and it was found that in all cases their ultraviolet transmission was restored to its original figure.

This was repeated at 400° C. for one hour's heating with similar results.

It is obvious that still lower temperatures might be used by heating for still longer periods, hence I do not desire to be limited to the exact temperatures and periods of heating given herein, except as indicated by the scope of the claims appended thereto.

Samples of glasses thus revivified have been exposed again to ultraviolet radiation and it was found that they acted the same way as before they lost their original transparency, namely, that after long continued exposure their transparency was lost but could be restored again by heating, and that this could be repeated several times without an apparent fatigue.

In the course of my experiments I also noticed that glasses exposed to long continued ultraviolet radiation showed a slight change in their visible color, but that their original color was also restored upon heating.

It will therefore be apparent that I have devised a new and useful means of simply and cheaply revivifying glasses which have lost their ultraviolet transmitting properties.

I claim:

1. The method of restoring the property of ultraviolet transmission to ultraviolet transmitting glasses that have lost their property of transparency to certain ultraviolet radiation, which consists in heating them to a temperature approximating their annealing temperature.

2. The method of restoring the property of ultraviolet transmission to ultraviolet transmitting glasses that have lost their property of transparency to certain ultraviolet radiation, which consists in heating them to 550° C.

3. The method of restoring the property of ultraviolet transmission to ultraviolet transmitting glasses that have lost their property of transparency to certain ultraviolet radiation, which consists in heating them to 550° C. for 15 minutes.

4. The method of restoring the property of ultra-violet transmission to ultra-violet transmitting glasses that have lost their property of transparency to certain ultra-violet radiations which consists in subjecting such glasses to a heat treatment as great as that resulting from heating them to 550° C. for fifteen minutes.

HARRISON P. HOOD.